US010549421B2

(12) United States Patent
Matsumoto et al.

(10) Patent No.: US 10,549,421 B2
(45) Date of Patent: Feb. 4, 2020

(54) CONTROL DEVICE, CONTROL METHOD, AND NON-TRANSITORY RECORDING MEDIUM

(71) Applicant: Hitachi, Ltd., Tokyo (JP)

(72) Inventors: Kohsei Matsumoto, Tokyo (JP); Tomoaki Akitomi, Tokyo (JP); Kazuo Yano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 15/670,175

(22) Filed: Aug. 7, 2017

(65) Prior Publication Data
US 2018/0043531 A1 Feb. 15, 2018

(30) Foreign Application Priority Data

Aug. 9, 2016 (JP) ................................ 2016-156147

(51) Int. Cl.
*B25J 9/16* (2006.01)
*G05B 13/02* (2006.01)

(52) U.S. Cl.
CPC ............. *B25J 9/163* (2013.01); *B25J 9/1633* (2013.01); *B25J 9/1653* (2013.01); *B25J 9/1679* (2013.01)

(58) Field of Classification Search
CPC ........ B25J 9/163; B25J 9/1633; B25J 9/1653; B25J 9/1679; G05B 13/0265; G05B 2219/40499
See application file for complete search history.

(56) References Cited

U.S. PATENT DOCUMENTS

2017/0028562 A1* 2/2017 Yamazaki ............... B25J 9/1612
2017/0357242 A1* 12/2017 Watanabe ................ B25J 19/06
2018/0099408 A1* 4/2018 Shibata .................... B25J 9/163

FOREIGN PATENT DOCUMENTS

| JP | 2003-340760 A | 12/2003 |
| JP | 2006-320997 A | 11/2006 |
| JP | 2016-95754 A | 5/2016 |

OTHER PUBLICATIONS

Japanese Office Action received in corresponding Japanese Application No. 2016-156147 dated Dec. 3, 2019.

* cited by examiner

*Primary Examiner* — Robert T Nguyen
(74) *Attorney, Agent, or Firm* — Mattingly & Malur, PC

(57) ABSTRACT

A control device controls a subject to be controlled that obtains a certain state by an action, and is configured to conduct: an obtaining process to obtain the state and the action of the subject to be controlled from the subject to be controlled; a generating process to generate a reward that causes a next action of the subject to be controlled to optimize a next state of the subject to be controlled, based on the state and the action of the subject to be controlled; a selecting process to select a next action of the subjected to be controlled, based on the state and the action of the subject to be controlled, and the reward; and a control process to give a control command value to the subject to be controlled, the control command value corresponding to the next action of the subject to be controlled.

12 Claims, 7 Drawing Sheets

FIG. 3

| ATTEMPT ID | EPISODE ID | SWING ANGLE | KNEE ANGLE MEASURED VALUE | | | | | KNEE ANGLE COMMAND VALUE | | | | | MAXIMUM SWING ANGLE RATIO |
|---|---|---|---|---|---|---|---|---|---|---|---|---|---|
| | | | θ | θ/2 | 0 | -θ/2 | -θ | θ | θ/2 | 0 | -θ/2 | -θ | |
| Tr1 | ep11 | 2×θ11_1 | Φ11_1a | Φ11_1b | Φ11_1c | Φ11_1d | Φ11_1e | Ψ11_1a | Ψ11_1b | Ψ11_1c | Ψ11_1d | Ψ11_1e | NA |
| | | | Φ11_2a | Φ11_2b | Φ11_2c | Φ11_2d | Φ11_2e | Ψ11_2a | Ψ11_2b | Ψ11_2c | Ψ11_2d | Ψ11_2e | NA |
| | | ⋮ | ⋮ | ⋮ | ⋮ | ⋮ | ⋮ | ⋮ | ⋮ | ⋮ | ⋮ | ⋮ | ⋮ |
| | ep12 | 2×θ11_2 | Φ11_wa | Φ11_wb | Φ11_wc | Φ11_wd | Φ11_we | Ψ11_wa | Ψ11_wb | Ψ11_wc | Ψ11_wd | Ψ11_we | NA |
| | | 2×θ12_1 | Φ12_1a | Φ12_1b | Φ12_1c | Φ12_1d | Φ12_1e | Ψ12_1a | Ψ12_1b | Ψ12_1c | Ψ12_1d | Ψ12_1e | NA |
| | | ⋮ | ⋮ | ⋮ | ⋮ | ⋮ | ⋮ | ⋮ | ⋮ | ⋮ | ⋮ | ⋮ | ⋮ |
| | ⋮ | 2×θ12_x | Φ12_xa | Φ12_xb | Φ12_xc | Φ12_xd | Φ12_xe | Ψ12_xa | Ψ12_xb | Ψ12_xc | Ψ12_xd | Ψ12_xe | NA |
| | ep1m | 2×θ1m_1 | Φ1m_ya | Φ1m_yb | Φ1m_yc | Φ1m_yd | Φ1m_ye | Ψ1m_ya | Ψ1m_yb | Ψ1m_yc | Ψ1m_yd | Ψ1m_ye | NA |
| Tr2 | ep21 | 2×θ21_1 | Φ21_1a | Φ21_1b | Φ21_1c | Φ21_1d | Φ21_1e | Ψ21_1a | Ψ21_1b | Ψ21_1c | Ψ21_1d | Ψ21_1e | r21_1 |
| | | ⋮ | ⋮ | ⋮ | ⋮ | ⋮ | ⋮ | ⋮ | ⋮ | ⋮ | ⋮ | ⋮ | ⋮ |
| | | 2×θ21_x | Φ21_xa | Φ21_xb | Φ21_xc | Φ21_xd | Φ21_xe | Ψ21_xa | Ψ21_xb | Ψ21_xc | Ψ21_xd | Ψ21_xe | r21_x |
| | ep2m | 2×θ2m_1 | Φ2m_1a | Φ2m_1b | Φ2m_1c | Φ2m_1d | Φ2m_1e | Ψ2m_1a | Ψ2m_1b | Ψ2m_1c | Ψ2m_1d | Ψ2m_1e | r2m_1 |
| | | 2×θ2m_x | Φ2m_xa | Φ2m_xb | Φ2m_xc | Φ2m_xd | Φ2m_xe | Ψ2m_xa | Ψ2m_xb | Ψ2m_xc | Ψ2m_xd | Ψ2m_xe | r2m_x |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 4

| Attempt ID (301) | Episode ID (302) | Measurement Swinging State (403) | | | | | Selection Swinging State (404) | | | | |
|---|---|---|---|---|---|---|---|---|---|---|---|
| | | θ | θ/2 | 0 | -θ/2 | -θ | θ | θ/2 | 0 | -θ/2 | -θ |
| Tr1 | ep11 | 0 (SWING) | 1 (STAND) | 0 | 1 | 1 | 0 | 1 | 0 | 1 | 1 |
| | ep12 | 1 | 0 | 0 | 1 | 0 | 1 | 0 | 1 | 1 | 0 |
| | ... | 1 | 1 | ... | ... | ... | 1 | 0 | ... | ... | ... |
| | ep1m | 1 | 0 | 1 | 0 | 1 | 0 | 1 | 1 | 0 | 1 |
| Tr2 | ep21 | 0 | 1 | 1 | 1 | 0 | 1 | 1 | 1 | 1 | 0 |
| | ... | 1 | 1 | 1 | 1 | 1 | 1 | 1 | 1 | 1 | 1 |
| | ep2m | 1 | 1 | 1 | 1 | 1 | 1 | 1 | 1 | 1 | 0 |
| ... | | ... | ... | ... | ... | ... | ... | ... | ... | ... | ... |

400 ATTEMPT STATE MANAGEMENT TABLE

CONTROL DEVICE, CONTROL METHOD, AND NON-TRANSITORY RECORDING MEDIUM

CLAIM OF PRIORITY

The present application claims priority from Japanese patent application JP 2016-156147 filed on Aug. 9, 2016, the content of which is hereby incorporated by reference into this application.

BACKGROUND

The present invention relates to a control device configured to control a subject to be controlled, a control method, and a control program.

Japanese Patent Laid-open Application Publication No. 2003-340760 discloses a robot apparatus that makes actions in accordance with supplied input information. In this robot apparatus, an action controller calculates an action value, and determines an action to make based on the value. When the action controller makes an action, a reward is given by an environment or a user. The action controller updates the action value based on the reward given by the environment or user, and a predetermined learning rate. The action controller is also configured to change the learning rate based on the input information.

However, in the technology of Japanese Patent Laid-open Application Publication No. 2003-340760, the provision of a reward is not automated, and therefore, there is a problem of not being able to automatically obtain a control method for a subject to be controlled.

SUMMARY

An object of the present invention is to make it possible to automatically obtain a control method for a subject to be controlled.

An aspect of the invention disclosed in this application is a control device controlling a subject to be controlled that obtains a certain state by an action, the control device comprising: a processor configured to execute a program; a storage device configured to store the program; and a communication interface configured to communicate with the subject to be controlled, wherein the processor is configured to conduct: an obtaining process to obtain the state and the action of the subject to be controlled from the subject to be controlled; a generating process to generate a reward that causes a next action of the subject to be controlled to optimize a next state of the subject to be controlled, based on the state and the action of the subject to be controlled obtained in the obtaining process; a selecting process to select a next action of the subjected to be controlled, based on the state and the action of the subject to be controlled obtained in the obtaining process, and the reward generated in the generating process; and a control process to give a control command value to the subject to be controlled, the control command value corresponding to the next action of the subject to be controlled selected in the selecting process.

According to a representative embodiment of the present invention, it is possible to reduce a burden of setting a reward.

BRIEF DESCRIPTION OF THE DRAWINGS

FIG. 3 is a diagram for explaining an example of the storage content of the input/output data table.

FIG. 4 is a diagram for explaining an example of the storage content of the attempt state management table.

DETAILED DESCRIPTION OF THE EMBODIMENT

<Configuration Example of Control System>

Figure 1:
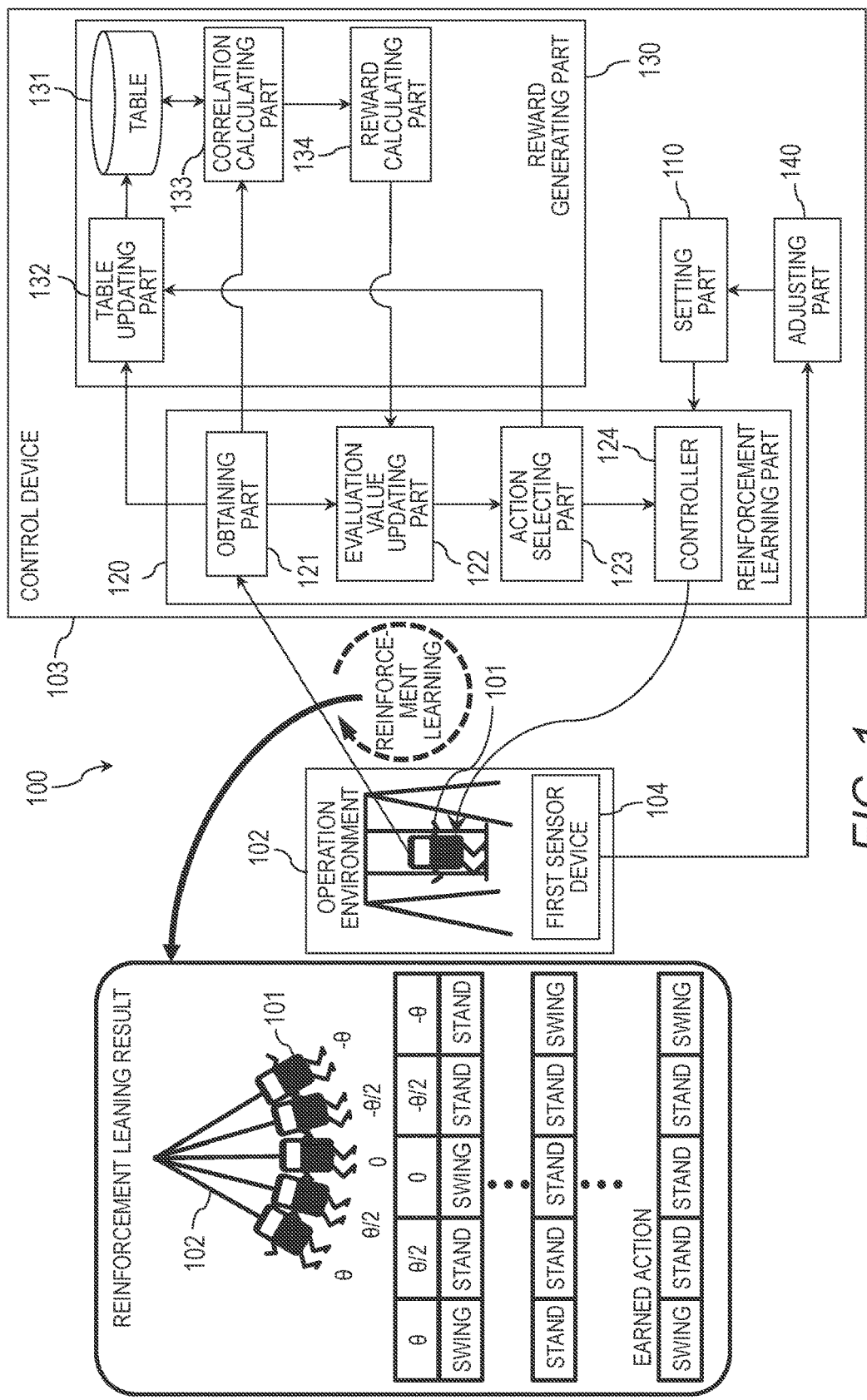
FIG. 1 is a diagram for explaining a configuration example of a control system.

FIG. 1 is a diagram for explaining a configuration example of a control system 100. The control system 100 includes a subject to be controlled 101 that obtains a state "s" by an action "a," an operation environment 102, and a control device 103. In this embodiment, the operation environment 102 is a swing, and the subjected to be controller 101 is a robot that swings on the swing, for example. The control system 100 conducts reinforcement learning on the subject to be controlled 101 by repeating a series of actions of observing the subject to be controlled 101 that makes an action in the operation environment 102 and giving a reward "r."

When the combination of the subject to be controlled 101 and the operation environment 102 is a robot and a swing, the action "a" of the robot is to swing back and forth, and the state "s" of the robot is the swing angle ratio (the ratio of the current swing angle to the previous swing angle where the swing angle is the angle of the swing relative to the supporting pillar) of the swing seat (where the robot sits on). The reward "r" to be given to the robot is a parameter that determines the likelihood of the action "a" to make the swing angle of the swing greater.

In this embodiment, the swing action, which is the action "a," is defined as a state of the robot at each phase obtained by dividing the swing angle 2θ by 5 (θ, θ/2, 0, −θ/2, −θ). The swing angle 2θ is one cycle. The state of the robot is a mode of the swinging action of the robot, and in this embodiment, includes a state in which the robot is swinging back and forth (swinging state: SWING in FIG. 1), and a state in which the robot is standing on the swing seat (Standing state: STAND in FIG. 1).

The control system 100 may also have a first sensor device 104 to detect external disturbance in and around the operation environment 102. The external disturbance is disturbance that occurs in and around the operation environment 102 where the robot and the entire swing are located, and examples thereof include wind speed, temperature and humidity, rainfall amount, snowfall amount, brightness, amount of dust. The first sensor device 104 is connected to the control device 103.

The control device 103 includes a setting part 110, a reinforcement learning part 120, a reward generating part 130, and an adjusting part 140.

The setting part 110 conducts initial settings by automatically reading data from a first storage device 212 or manual input from a user. The setting part 110 sets, for example, a learning coefficient α at one attempt, a discount rate γ, a maximum number of episodes, episode ending conditions, an initial reward, a parameter given to the operation environment 102, and a parameter given to the subject to be controlled 101.

The maximum number of episodes is the maximum number of episodes that can be performed in one attempt. An episode is an operation unit from the start to end of an operation of the subject to be controlled by the action "a" or the state "s." The episode ending condition is a condition that determines whether one episode should be ended or not. Examples of the condition under which an episode should not be ended include when an episode needs to be continued until ten cycles are completed since the swing started to move. Examples of the condition to end an episode include when the swing angle goes under a lower limit threshold value in several cycles in a row. Another example of the condition to end an episode is when the swing angle goes over an upper limit threshold value in several cycles in a row. Yet another example of the condition to end an episode is when a prescribed period of time has passed since the start of the episode.

The initial reward is an initial value of the reward "r," which is a variable of the action value function in the reinforcement learning. Examples of the parameter given to the operation environment 102 include initial speed given to the swing. Examples of the parameter given to the subject to be controlled 101 include an initial knee angle given to the robot, a lower limit threshold value of the swing angle of the robot, an upper limit threshold value of the swing angle, a target swing angle, and the number of phases (the number to divide one cycle by; five in this embodiment). The initial value of the reward "r" may be given randomly, or given based on findings with human beings. The earned reward may be used as is, or may be modified partially or entirely.

The reinforcement learning part 120 performs the reinforcement learning of the subject to be controlled 101. The reinforcement learning part 120 includes an obtaining part 121, an evaluation value updating part 122, an action selecting part 123, and a controller 124. The obtaining part 121 obtains, as sensor data, the swing angle for one cycle and a knee angle measured value for each phase from the subject to be controlled 101. In this embodiment, the sensor data is the knee angle measured value of the robot, but the sensor data may additionally include the angle of the base of a thigh or the angle of an ankle. In this embodiment, the descriptions will be made for the knee angle, and the thigh angle or ankle angle will not be explained for the ease of explanation.

The evaluation value updating part 122 updates an evaluation value Q. Specifically, the evaluation value updating part 122 updates the evaluation value Q for each phase based on the action value function, for example. The updated evaluation value Q is Q $(s_t, a_t)$. "s" is the state of the subject to be controlled 101 (here, the swing angle θ), and "a" is the action (swing state) of the subject to be controlled 101. "$s_t$" is the state of the subject to be controlled 101 (here, the swing angle θ) before the update, and "at" is the action (swing state) of the subject to be controlled 101 before the update.

The evaluation value updating part 122 initializes the state "s" based on a measure π (s, a) derived from the evaluation value Q for one episode, and conducts the processes (1) to (4) described below repeatedly for each phase.

(1) The evaluation value updating part 122 determines the action "a" in the state "s" based on the measure π (s, a) derived from the evaluation value Q.

(2) The evaluation value updating part 122 causes the subject to be controlled 101 to perform the action "a," and observes a reward "r" and a state "$s_{t+1}$" after the action "a" is taken.

(3) The evaluation value updating part 122 updates the evaluation value Q.

$$Q(s_t, a_t)$$

$$\leftarrow Q(s_t, a_t) + \alpha[r_{t+1} + \gamma \max Q(s_{t+1}, a) - Q(s_t, a_t)]$$

α is a learning coefficient, and a parameter that takes a range of 0<α≤1. γ is a discount rate, and a parameter that takes a range of 0<α≤≤1. $r_{t+1}$ is the reward "r" after the update. $s_{t+1}$ is the state of the subject to be controlled 101 (here, the swing angle θ) after the update. γmaxQ $(s_{t+1}, a_t)$ is a value obtained when the action "a" with the highest Q value is selected in the state $s_{t+1}$, and is derived by multiplying the highest value Q by γ.

(4) The evaluation value updating part 122 ends an episode when the state $s_{t+1}$ fulfills the episode ending condition.

In this embodiment, by automatically calculating the reward "r" and giving the resultant reward "r" to the evaluation value Q, the action to be taken is automatically performed.

The action selecting part 123 selects an action "a" for the next cycle of the subject to be controlled 101 for each phase. Specifically, the action selecting part 123 compares the current evaluation value Q with the previous evaluation value Q for each phase, for example. If the current evaluation value Q is equal to or greater than the previous evaluation value Q for a certain phase, the action selecting part 123 selects the same action as the previous action "a" for the next cycle in the phase. For example, if the previous action "a" in the phase was "swing," the action selecting part 123 selects "swing" for the action "a" for that phase in the next cycle.

On the other hand, if the current evaluation value Q is smaller than the previous evaluation value Q for a certain phase, the action selecting part 123 selects an action differing from the previous action "a" for that phase in the next cycle. For example, if the previous action "a" in the phase was "swing," the action selecting part 123 selects "stand" for the action "a" for that phase in the next cycle.

The action selecting part 123 may select the action "a" for the next cycle for at least one phase by randomness. The action selecting part 123 may randomly select the phase to apply the randomness.

The controller 124 generates a control command for each selected action, and controls the subject to be controlled 101. Specifically, the controller 124 generates a control command and sends it to the subject to be controlled 101, for example. The control command for each selected action is an electric current value given to an actuator 223 that changes the knee angle of the robot for the swinging state and the standing state, for example.

The reward generating part 130 includes a table 131, a table updating part 132, a correlation calculating part 133, and a reward calculating part 134. The table 131 includes an input/output data table 300 and an attempt state management table 400. The input/output data table 300 will be explained in detail later with reference to FIG. 3. The attempt state management table 400 will be explained in detail later with reference to FIG. 4.

The table updating part 132 updates the input/output data table 300 and the attempt state management table 400. The correlation calculating part 133 refers to the input/output data table 300 and the attempt state management table 400, and calculates the correlation information between the measured swinging state 403 and the maximum swing angle ratio 306 for each phase. The reward calculating part 134 calculates the reward (specifically, the reward $r_{t+1}$ after update), and gives the reward to the evaluation value updating part 122.

The adjusting part 140 detects external disturbance in the operation environment 102 using the first sensor device 104, and increases or decreases the maximum number of episodes performed by the subject to be controlled 101. If the external disturbance occurs frequently, the target would not be achieved for a continued period of time. In this case, by decreasing the maximum number of episodes, the scope of the episodes used for the calculation of the reward "r" can be limited to immediate episodes. On the other hand, if external disturbance does not occur frequently, by increasing the maximum number of episodes, the data range used for the calculation of the reward "r" is widened. In a case in which there is no sensor device, and the external disturbance in the operation environment 102 cannot be detected directly, if the learning does not progress, or in other words, if the target variable such as the maximum swing angle does not improve or improves too slowly, a process similar to above may be performed.

<Hardware Configuration of Control System 100>

Figure 2:
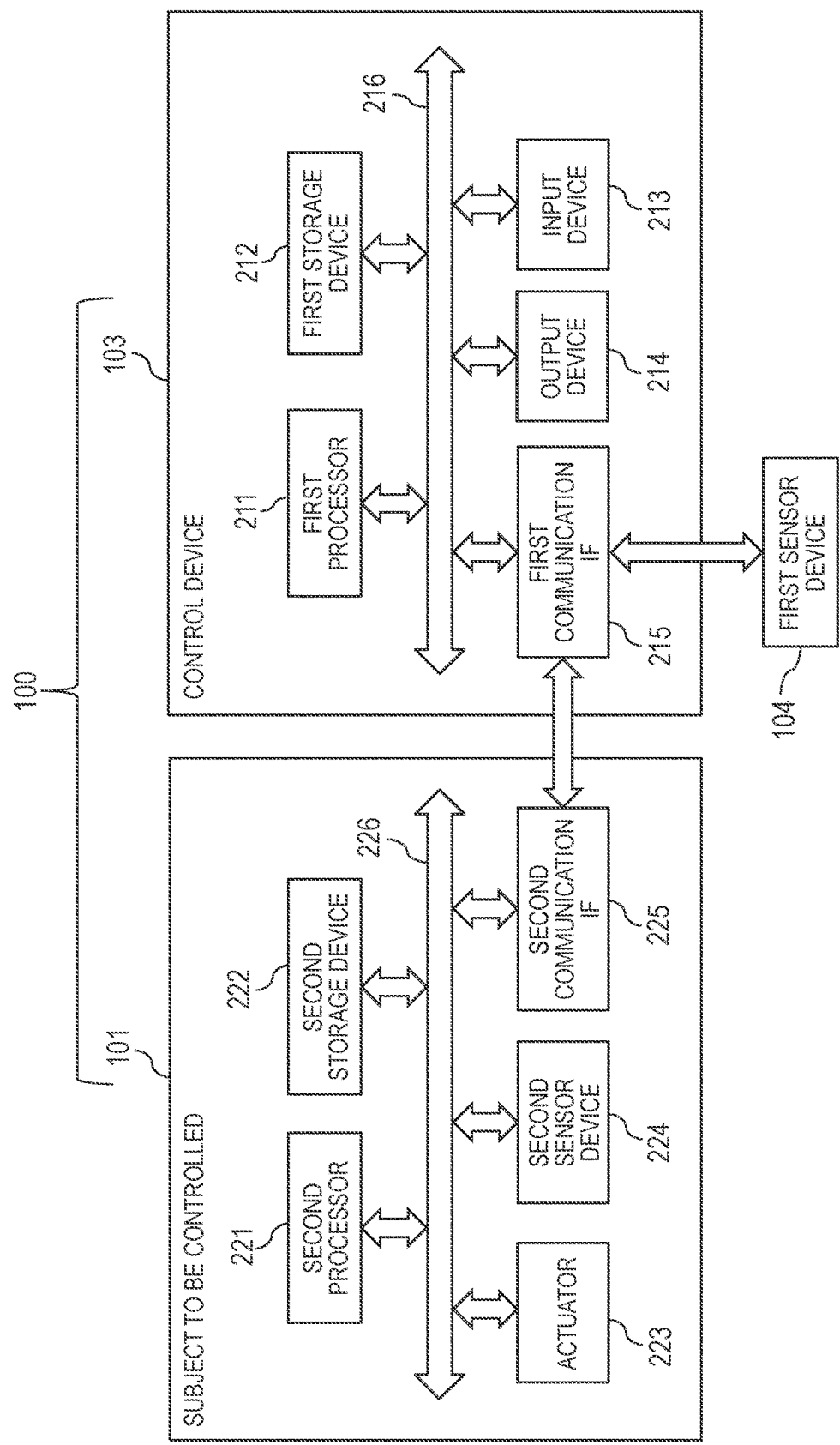
FIG. 2 is a block diagram for explaining a hardware configuration example of the control system.

FIG. 2 is a block diagram for explaining a hardware configuration example of the control system 100. The control device 103 includes a first processor 211, a first storage device 212, an input device 213, an output device 214, and a first communication interface (IF) 215. The first processor 211, the first storage device 212, the input device 213, the output device 214, and the first communication IF 215 are connected to a first bus 216. The first sensor device 104 is connected to the first communication IF 215. The first processor 211 controls the control device 103. The first storage device 212 is a working area of the first processor 211. The first storage device 212 is a non-temporary or temporary recording medium that stores various types of programs and data. Examples of the first storage device 212 include ROM (read only memory), RAM (random access memory), HDD (hard disk drive), and flash memory.

The input device 213 is used to input data. Examples of the input device 213 include a keyboard, mouse, touch panel, numeric keys, and scanner. The output device 214 is used to output data. Examples of the output device 214 include a display and printer. The first communication IF 215 is connected to the network, and exchanges data with the subject to be controlled 101.

Specifically, the setting part 110, the reinforcement learning part 120, the reward generating part 130, and adjusting part 140 described above are realized by the first processor 211 executing programs stored in the first storage device 212, for example. Specifically, the table 131 (input/output data table 300 and attempt state management table 400) is realized as the data structure stored in the first storage device 212, for example.

The subject to be controlled 101 includes a second processor 221, a second storage device 222, an actuator 223, a second sensor device 224, and a second communication IF 225. The second processor 221, the second storage device 222, the actuator 223, the second sensor device 224, and the second communication IF 225 are connected through a second bus 226. The second processor 221 controls the subject to be controlled 101. The second storage device 222 is a working area of the second processor 221. The second storage device 222 is a non-temporary or temporary recording medium that stores various types of programs and data. Examples of the second storage device 202 include ROM (read only memory), RAM (random access memory), HDD (hard disk drive), and flash memory.

The actuator 223 is a driving mechanism that converts the input energy to physical motion such as translational motion or rotary motion. Specifically, the actuator 223 is disposed at the base of a thigh, knee, or ankle, which constitutes each leg of the robot, and drives the legs of the robot with the electric current value instructed by the control device 103, for example. The second sensor device 224 is a gyro sensor that detects angular velocity from which the swing angle of the robot with respect to the swing is calculated. The second communication IF 225 is connected to the network, and exchanges data with the control device 103.

<Example of Storage Content in Table 131>

Next, using FIGS. 3 and 4, an example of the storage content in the table 131 shown in FIG. 1 will be explained. In this example, the data structure takes the table format, but the data structure does not need to be in the table format, but may be another data structure such as a list, database, or queue. In the descriptions of the table, a value of AA field bbb (AA is the field name, and bbb is the reference character) may also be described as AAbbb. For example, a value of the attempt ID field 301 is described as an attempt ID 301.

FIG. 3 is a diagram for explaining an example of the storage content of the input/output data table 300. In FIG. 3, the input/output data table 300 is a table that manages data input from the subject to be controlled 101, and data to be output to the subject to be controlled 101. The input/output data table 300 includes an attempt ID field 301, an episode ID field 302, a swing angle field 303, a knee angle measured value field 304, a knee angle command value field 305, and a maximum swing angle ratio field 306. Columns of the respective fields 301 to 306 include the values of the respective fields.

The attempt ID field 301 is a storage area that stores an attempt ID. The attempt ID 301 is identification information that uniquely identifies an attempt of an action of the subject to be controlled 101 in the operation environment 102. The initial setting is performed by the setting part 110 for each attempt ID 301.

The episode ID field 302 is a storage area that stores an episode ID. The episode ID 302 is identification information that uniquely identifies an episode. An episode is an operation unit from the start to end of an operation of the subject to be controlled 101 performed in the operation environment 102. For example, when the swing angle goes above the upper limit threshold value, or when the swing angle goes below the lower limit threshold value, an episode is ended. The number of episodes "m" in one attempt (m is an integer of 1 or greater) is set in the initial setting by the setting part 110.

The swing angle field 303 is a storage area that stores the swing angle $2\times\theta$ in an episode. The swing angle 303 is measured by the obtaining part 121. The swing angle 303 is a value that can be an explanatory variable in the correlation calculation by the correlation calculating part 133.

The knee angle measured value field 304 is a storage area that stores the knee angle measured value in an episode. The knee angle measured value 304 is a measured value of a knee angle of the robot. The knee angle measured value 304 is a value that can be an explanatory variable in the correlation calculation by the correlation calculating part 133. The knee angle measured value 304 is obtained by the obtaining part 121. The knee angle measured value 304 is stored for each phase of the swing angle 303.

The knee angle command value field 305 is a storage area that stores the knee angle command value in an episode. The knee angle command value 305 is a command value to set the knee angle of the robot to a desired angle. More specifically, the knee angle command value 305 is a control command value given to the actuator 223 such as an electric current amount, for example. The knee angle command value 305 is a value that can be an explanatory variable in the correlation calculation by the correlation calculating part 133. The knee angle command value 305 is stored for each phase of the swing angle 303.

The maximum swing angle ratio field 306 is a storage area that stores the maximum swing angle ratio. The maximum swing angle ratio 306 is calculated by the table updating part 132. The maximum swing angle ratio 306 is a value that can be an objective variable in the correlation calculation by the correlation calculating part 133. The maximum swing angle ratio 306 is a ratio of the maximum value of the swing angle 303 at the previous attempt ID 301 in the episode ID 302 to the current swing angle 303. For example, if the maximum swing angle in the attempt ID: Tr1 is the swing angle 303 (2×θ 11_1) of the episode ID: ep11, and the current swing angle 303 is the swing angle 303 (2×θ2m_1) of the episode: ep2m of the attempt ID: Tr2, the maximum swing angle ratio 306 (r2m_1) is $r2m\_1 = \theta 2m\_1 / \theta 11\_1.$ For the first attempt ID: Tr1, because there is no swing angle 303 of the previous attempt ID 301, nothing is entered in the maximum swing angle ratio 306 (NA (not available)). Alternatively, by setting the previous maximum swing angle to an appropriate value in the initial setting, the first maximum swing angle ratio 306 can be stored.

The input/output data table 300 may include the swing angle ratio. The swing angle ratio is a value that can be an explanatory variable in the correlation calculation by the correlation calculating part 133. The swing angle ratio is a ratio of the previous swing angle to the current swing angle. For example, in the episode ID: ep11, r11_2, which is the swing angle ratio of the previous swing angle 303 (2×θ11_1) to the current swing angle 303 (2×θ11_2), is r11_2=θ11_2/θ11_1.

For the first entry of the episode ID 302, there is no previous swing angle 303, and therefore, the swing angle ratio is not entered (NA (not available)). Alternatively, by setting the previous swing angle 303 to an appropriate value in the initial setting, the first swing angle ratio may be stored.

FIG. 4 is a diagram for explaining an example of the storage content of the attempt state management table 400. The attempt state management table 400 includes an attempt ID field 301, an episode ID field 302, a measured swinging state field 403, and a selected swinging state field 404. Columns of the respective fields 301, 302, 403, and 404 include the values of the respective fields.

The measured swinging state field 403 is a storage area that stores the measured swinging state. The measured swinging state 403 is the swinging state corresponding to the knee angle measured value 304 in an episode. Specifically, the measured swinging state 403 is a value obtained by conducting binarization on the knee angle measured value 304 with a certain threshold angle, for example. In this example, the swinging state is "0" and the standing state is "1." The measured swinging state 403 is stored for each phase of the swing angle. The measured swinging state 403 is a value that can be an explanatory variable in the correlation calculation by the correlation calculating part 133.

The selected swinging state field 404 is a storage area that stores the selected swinging state. The selected swinging state 404 is a swinging state selected by the action selecting part 123 in an episode. The selected swinging state 404 is stored for each phase of the swing angle 303. The measured swinging state 403 is a value obtained by conducting binarization on the measured value of the knee angle when the robot is controlled with the selected swinging state 404 of the same entry.

<Example of Reinforcement Learning Process Procedures>

Figure 5:
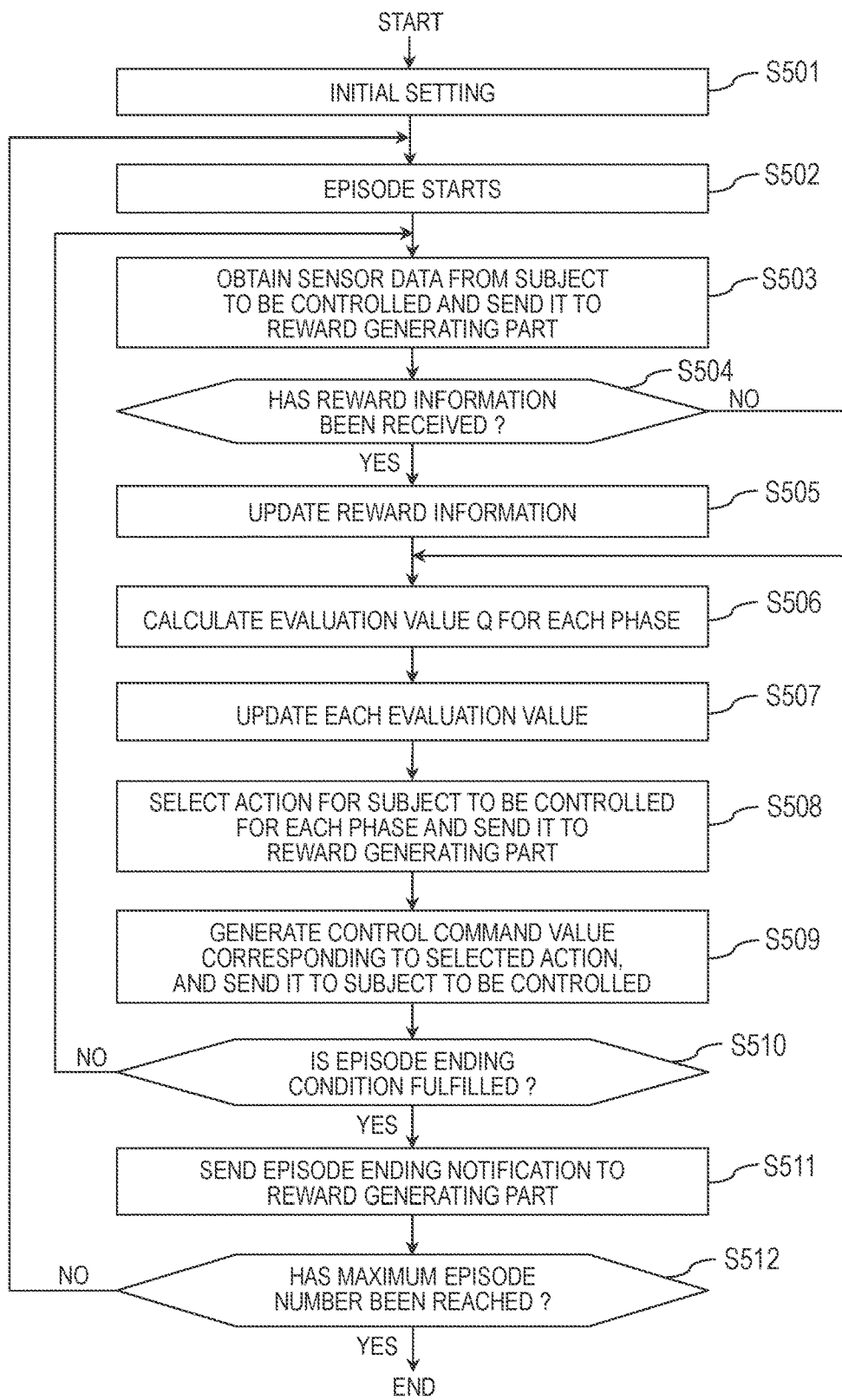
FIG. 5 is a flowchart showing an example of reinforcement learning process procedures by the setting part and the reinforcement learning part.

FIG. 5 is a flowchart showing an example of reinforcement learning process procedures by the setting part 110 and the reinforcement learning part 120. FIG. 5 shows an example of the reinforcement learning process procedures in one attempt. The setting part 110 conducts initial settings by automatically reading data from the first storage device 212 or manual input from a user (Step S501). In the initial setting, for example, the learning coefficient α of one attempt, the discount rate γ, the maximum number of episodes, the episode ending condition, the initial reward, the parameter given to the operation environment 102, and the parameter given to the subject to be controlled 101 are set.

After the initial setting, the reinforcement learning part 120 starts an episode (Step S502). The reinforcement learning part 120 causes the obtaining part 121 to measure the sensor data from the subject to be controlled 101, and sends the sensor data to the reward generating part 130 (Step S503). The sensor data includes the swing angle for one cycle and the knee angle measured value for each phase of the robot.

Next, the reinforcement learning part 120 causes the evaluation value updating part 122 to determine whether a reward "r" has been received from the reward generating part 130 or not (Step S504). If not (Step S504: No), the process moves to Step S506. On the other hand, if the reward "r" has been received (Step S504: Yes), the reinforcement learning part 120 causes the evaluation value updating part 122 to update the reward "r" to the received reward "r" (Step S505), and the process moves to Step S506.

Next, the reinforcement learning part 120 causes the evaluation value updating part 122 to calculate the evaluation value using the action value function for each phase (Step S506), and maintains the calculated current evaluation value as the latest evaluation value Q (Step S507).

Next, the reinforcement learning part 120 causes the action selecting part 123 to select an action "a" for the next cycle of the subject to be controlled 101 for each phase (Step S508). The action selecting part 123 sends the information of selected action to the reward generating part 130.

Next, the reinforcement learning part 120 causes the controller 124 to generate a control command value for each selected action and send the command value to the subject to be controlled 101 (Step S509).

Thereafter, the reinforcement learning part 120 determines whether the episode ending condition, which is set by the setting part 110, is fulfilled or not (Step S510). If not (Step S510: No), the process returns to Step S503. If the condition is fulfilled (Step S510: Yes), the reinforcement learning part 120 sends an ending notification for the episode to the reward generating part 130 (Step S511). Then, the reinforcement learning part 120 determines whether the maximum episode number, which is set by the setting part 110, has been reached or not (Step S512). If not (Step S512: No), the process returns to Step S502. If the maximum episode number has been reached (Step S512: Yes), the reinforcement learning part 120 ends the attempt.

<Example of Reward Generating Process Procedures>

Figure 6:
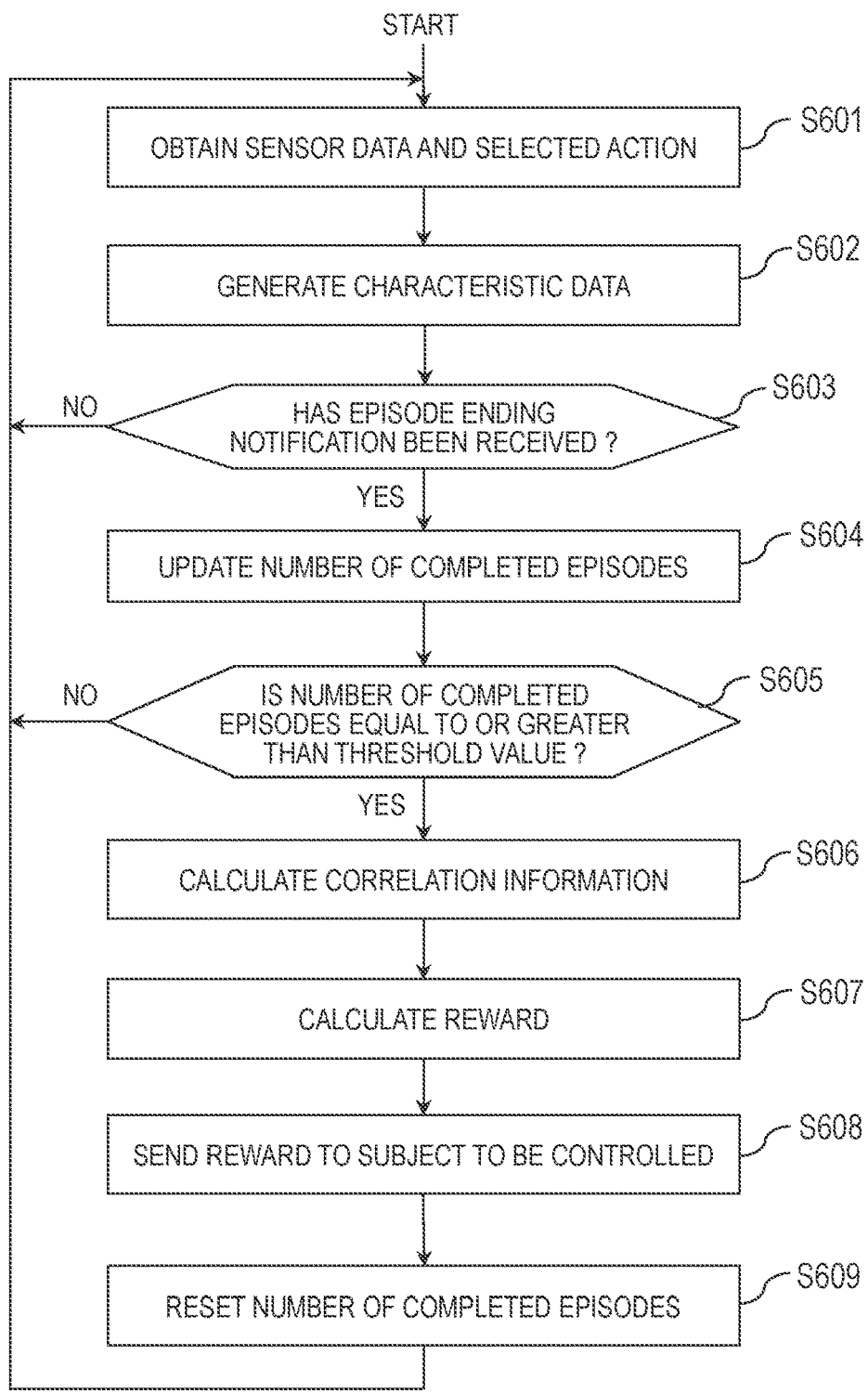
FIG. 6 is a flowchart showing an example of the reward generating process procedures by the reward generating part.

FIG. 6 is a flowchart showing an example of the reward generating process procedures by the reward generating part 130. The reward generating part 130 causes the table updating part 132 to obtain the sensor data for each phase, which was sent in Step S503, and the information of selected action for each phase, which was sent in Step S508 (Step S601). The sensor data, which was sent in Step S503, includes the swing angle for one cycle and the knee angle measured value for each phase of the robot. Specifically, the reward generating part 130 causes the table updating part 132 to enter the obtained swing angle for one cycle in the swing angle field 303, and the knee angle measured value for each phase in the knee angle measured value field 304 in an entry of the current episode ID 302 in the current attempt ID 301 of the input/output data table 300, for example. Also, the reward generating part 130 causes the table updating part 132 to enter the information of selected action ("0" (SWING) or "1" (STAND)) in the selected swinging state field 404 in an entry of the current episode ID 302 in the current attempt ID 301 of the attempt state management table 400.

Next, the reward generating part 130 causes the table updating part 132 to generate characteristic data (Step S602). Specifically, the reward generating part 130 causes the table updating part 132 to perform binarization on the knee angle measured value 304 for each phase of the robot, which is stored in an entry of the current episode ID 302 in the current attempt ID 301 of the input/output data table 300, for example. This way, in the reward generating part 130, the table updating part 132 generates the characteristic data, which is a value that indicates one of "0" (SWING) and "1" (STAND). Then, in the reward generating part 130, the table updating part 132 enters the generated characteristic data in the measured swinging state 403 in an entry of the current episode ID 302 in the current attempt ID 301 of the attempt state management table 400.

Also, the reward generating part 130 causes the table updating part 132 to calculate, as the characteristic data, the maximum swing angle ratio 306 in the current episode, and stores the resultant value in the entry of the current episode ID 302 in the current attempt ID 301 of the input/output data table 300.

Next, the reward generating part 130 determines whether the episode ending notification from the reinforcement learning part 120 (Step S511) has been received or not (Step S603). If not (Step S603: No), the process returns to Step S601. If the notification is received (Step S603: Yes), the reward generating part 130 updates the number of completed episodes by incrementing the value (Step S604). The reward generating part 130 determines whether the number of completed episodes is equal to or greater than a threshold value or not (Step S605). If smaller than the threshold value (Step S605: No), the process returns to Step S601, and Step S601 for the next episode ID 302 is conducted.

On the other hand, if the number of completed episodes is equal to or greater than the threshold value (Step S605: Yes), the reward generating part 130 causes the correlation calculating part 133 to calculate the correlation information (Step S606). If the number of completed episodes is equal to or greater than the threshold value (Step S605: Yes), the input/output data table 300 and the attempt state management table 400 have the same number of entries of the episode ID 302 as the threshold value of the number of completed episodes in the current attempt ID 301.

Thus, the reward generating part 130 causes the correlation calculating part 133 to calculate the correlation information indicating the correlation between the swinging action (measured swinging state 403) for each phase and the maximum swing angle ratio 306. Specifically, if the number of completed episodes for an attempt having the attempt ID 301 of "Tr1" reaches the threshold value, for example, the measured swinging state 403 for each phase and the maximum swing angle ratio 306 (r1_11 to r1m_y) of the episode ep11 to ep1m are obtained. When a correlation coefficient R is obtained as an example of the correlation information, the correlation coefficient R is derived from each phase by the following formula.

$$R = \frac{\sum_{i=1}^{n}(xi - xav)(yi - yav)}{\sqrt{\left\{\sum_{i=1}^{n}(xi-xav)^2\right\}\left\{\sum_{i=1}^{n}(yi-yav)^2\right\}}}$$

where xi is the measured swinging state 403 in one phase, xav is the average of the measured swinging state 403 of an attempt ID 301, yi is the maximum swing angle ratio 306 in one phase, yav is the average of the maximum swing angle ratio 306 of an attempt ID 301, and n is the number with which the swing angle 303 was obtained in an attempt ID 301. In this example, the correlation between the measured swinging state 403 and the maximum swing angle ratio 306 was obtained, but it is also possible to obtain the correlation between the knee angle measured value 304 and the maximum swing angle ratio 306, or the correlation between the swing angle and the maximum swing angle ratio 306.

Next, the reward generating part 130 causes the reward calculating part 134 to calculate the reward "r" for each phase (Step S607). Specifically, the reward generating part 130 causes the reward calculating part 134 to calculate the reward "r" corresponding to the correlation information, for example. If the correlation information is the correlation coefficient R, for example, the range thereof is $-1 \leq R \leq 1$. The reward generating part 130 causes the reward calculating part 134 to set the increment $\Delta r$ of the reward "r" based on the difference between the correlation coefficient R in the previous attempt ID 301 and the correlation coefficient R in the current attempt ID 301, and update the current reward "r." Next, the reward generating part 130 sends the current reward "r" to the subject to be controlled 101 (Step S608), resets the number of completed episodes to "0" (Step S609), and returns to Step S601.

<Example of Data Range Adjustment Process Procedures>

Figure 7:
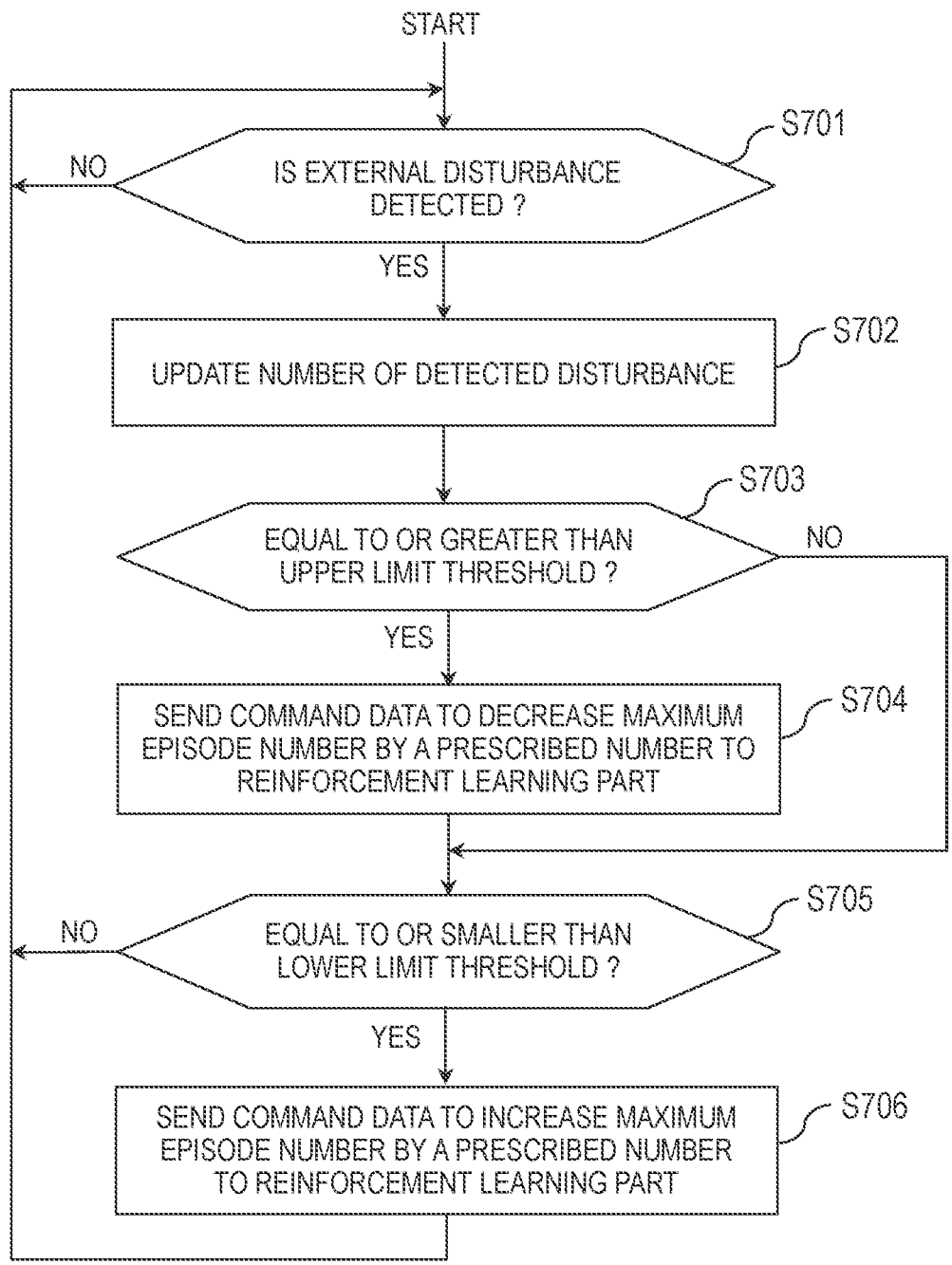
FIG. 7 is a flowchart showing an example of the data range adjustment process procedures by the adjusting part.

FIG. 7 is a flowchart showing an example of the data range adjustment process procedures by the adjusting part 140. The adjusting part 140 waits until external disturbance is detected by the first sensor device 104 (Step S701: No). If external disturbance is detected (Step S701: Yes), the adjusting part 140 updates the number of external disturbance detection by incrementing the value (Step S702). Next, the adjusting part 140 determines whether the number of external disturbance detection is equal to or greater than an upper limit threshold value or not (Step S703). If the upper limit threshold value is not reached (Step S703: No), the process moves to Step S705. On the other hand, if the number of external disturbance detection is equal or greater than the upper limit threshold value (Step S703: Yes), the adjusting part 140 sends to the reinforcement learning part 120 instruction data to decrease the maximum episode number by a prescribed number (Step S704), and the process moves to Step S705. This way, the reinforcement learning part 120 conducts reinforcement learning with a smaller maximum episode number. That is, in Step S512, the maximum episode number after reduction is used.

Next, the adjusting part 140 determines whether the number of external disturbance detection is below a lower limit threshold value or not (Step S705). If the number of external disturbance detection is not equal to or lower than the lower limit threshold value (Step S705: No), the process moves to Step S701. On the other hand, if the number of external disturbance detection is below the lower limit threshold value (Step S705: Yes), the adjusting part 140 sends to the reinforcement learning part 120 instruction data to increase the maximum episode number by a prescribed number (Step S706), and the process returns to Step S701. This way, the reinforcement learning part 120 conducts reinforcement learning with a greater maximum episode number. That is, in Step S512, the maximum episode number after increase is used.

As described above, with this embodiment, it is possible to reduce the burden of setting the reward. This makes it possible to control the subject to be controlled 101 such that the subject performs a desired action.

In the embodiment described above, a robot swinging on a swing was described as an example of the subject to be controlled 101, but other examples of the subject to be controlled 101 include moving objects such as an automobile, bicycle, motor cycle, scooter, electric assisted bicycle, train, ship, and airplane. In this case, an action "a" in the reinforcement leaning is input data given to the moving object to drive the moving object. In the case of an automobile, examples of the input data, i.e., the action "a," include the angle of steering wheel (handle), the stepping angle of an acceleration pedal, and the stepping angle of a brake pedal. The state "s" is output data for the action of the moving object when the moving object is moved by the action "a." In the case of an automobile, the state "s" is a distance from the vehicle driving ahead, for example.

When the subject to be controlled 101 is an industrial robot having an arm that picks up an object, the action "a" is the elbow angle of the arm or data obtained by conducting binarization on the elbow angle (information regarding the elbow angle), and the state "s" is the operation angle of the arm within a moving range that controls the arm such that the end of the arm comes to the location of the object.

By generating the reward based on the correlation between the action "a" (swinging state) and the state "s" (swing angle), the reward "r" is updated so that the control command value to achieve the objective (current value given to the actuator 223, for example) is obtained. This makes it possible to control the subject to be controlled 101 more quickly.

Also, the number of executions of the operation unit (episode) from the start to end of the action of the subject to be controlled 101 by the action "a" and state "s" is increased or decreased based on the external disturbance detected around the subject to be controlled 101. In this way, it is possible to set the period of the reinforcement learning by reflecting the effect of external disturbance on the maximum episode number. For example, if the external disturbance occurs frequently, the objective would not be continuously achieved. In this case, decreasing the maximum number of episodes limits the scope of the episodes used for the calculation of the reward "r" to immediate episodes. On the other hand, if external disturbance does not occur frequently, increasing the maximum number of episodes widens the data range used for the calculation of the reward "r".

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A control method by a control device controlling a subject to be controlled that obtains a certain state by an action, the control device comprising:
   a processor configured to execute a program;
   a storage device configured to store the program; and
   a communication interface configured to communicate with the subject to be controlled,
   wherein the processor is configured to conduct the method comprising:
   an obtaining process to obtain the state and the action of the subject to be controlled from the subject to be controlled;
   a generating process to generate a reward that causes a next action of the subject to be controlled to optimize a next state of the subject to be controlled, based on the state and the action of the subject to be controlled obtained in the obtaining process;
   a selecting process to select a next action of the subjected to be controlled, based on the state and the action of the subject to be controlled obtained in the obtaining process, and the reward generated in the generating process;
   a control process to give a control command value to the subject to be controlled, the control command value corresponding to the next action of the subject to be controlled selected in the selecting process, wherein an operation unit is repeatedly conducted from a start to end of an operation of the subject to be controlled by the action and the state;
   a detection process to detect external disturbance around the subject to be controlled;

an adjustment process to increase or decrease the number of executions of the operation unit based on the external disturbance detected in the detection process; and if a number of external disturbance detection is equal or greater than an upper limit threshold value, decreasing the maximum number of executions of the operation unit by a first prescribed number, and if the number of external disturbance detection is below a lower limit threshold value, increasing the maximum number of executions of the operation unit by a second prescribed number.

2. The control method according to claim 1,
wherein, when the subject to be controlled is a moving object, the action is input data given to the moving object to drive the moving object, and the state is output data regarding a motion of the moving object when the moving object is driven by the action.

3. The control method according to claim 1,
wherein, when the subject to be controlled has an arm that picks up an object, the action is information regarding an elbow angle of the arm, and the state is a motion angle of the arm to control the arm such that an end of the arm comes to a location of the object.

4. The control method according to claim 1, wherein the generating process includes generating the reward based on a correlation between the state and the action of the subject to be controlled.

5. A non-transitory recording medium having stored thereon a control program causing a processor controlling a subject to be controlled that obtains a certain state by an action to execute, the non-transitory recording medium being readable by the processor,
wherein the program causes the processor to execute:
an obtaining process to obtain the state and the action of the subject to be controlled from the subject to be controlled;
a generating process to generate a reward that causes a next action of the subject to be controlled to optimize a next state of the subject to be controlled, based on the state and the action of the subject to be controlled obtained in the obtaining process;
a selecting process to select a next action of the subjected to be controlled, based on the state and the action of the subject to be controlled obtained in the obtaining process, and the reward generated in the generating process;
a control process to give a control command value to the subject to be controlled, the control command value corresponding to the next action of the subject to be controlled selected in the selecting process, wherein an operation unit is repeatedly conducted from a start to end of an operation of the subject to be controlled by the action and the state;
a detection process to detect external disturbance around the subject to be controlled;
an adjustment process to increase or decrease the number of executions of the operation unit based on the external disturbance detected in the detection process; and
if a number of external disturbance detection is equal or greater than an upper limit threshold value, decreasing the maximum number of executions of the operation unit by a first prescribed number, and if the number of external disturbance detection is below a lower limit threshold value, increasing the maximum number of executions of the operation unit by a second prescribed number.

6. The non-transitory recording medium according to claim 5,
wherein, when the subject to be controlled is a moving object, the action is input data given to the moving object to drive the moving object, and the state is output data regarding a motion of the moving object when the moving object is driven by the action.

7. The non-transitory recording medium according to claim 5,
wherein, when the subject to be controlled has an arm that picks up an object, the action is information regarding an elbow angle of the arm, and the state is a motion angle of the arm to control the arm such that an end of the arm comes to a location of the object.

8. The non-transitory recording medium according to claim 5, wherein the generating process includes generating the reward based on a correlation between the state and the action of the subject to be controlled.

9. A control device controlling a subject to be controlled that obtains a certain state by an action, the control device comprising:
a processor configured to execute a program;
a storage device configured to store the program; and a communication interface configured to communicate with the subject to be controlled,
wherein the processor is configured to conduct:
an obtaining process to obtain the state and the action of the subject to be controlled from the subject to be controlled;
a generating process to generate a reward that causes a next action of the subject to be controlled to optimize a next state of the subject to be controlled, based on the state and the action of the subject to be controlled obtained in the obtaining process;
a selecting process to select a next action of the subjected to be controlled, based on the state and the action of the subject to be controlled obtained in the obtaining process, and the reward generated in the generating process; and
a control process to give a control command value to the subject to be controlled, the control command value corresponding to the next action of the subject to be controlled selected in the selecting process;
wherein the processor repeatedly conducts an operation unit from a start to end of an operation of the subject to be controlled by the action and the state;
wherein the processor is configured to conduct:
a detection process to detect external disturbance around the subject to be controlled; and
an adjustment process to increase or decrease the number of executions of the operation unit based on the external disturbance detected in the detection process; and
wherein if a number of external disturbance detection is equal or greater than an upper limit threshold value, the processor is configured to decrease the maximum number of executions of the operation unit by a first prescribed number, and if the number of external disturbance detection is below a lower limit threshold value, the processor is configured to increase the maximum number of executions of the operation unit by a second prescribed number.

10. The control device according to claim 9,
wherein, when the subject to be controlled is a moving object, the action is input data given to the moving object to drive the moving object, and the state is output data regarding a motion of the moving object when the moving object is driven by the action.

11. The control device according to claim 9, wherein, when the subject to be controlled has an arm that picks up an object, the action is information regarding an elbow angle of the arm, and the state is a motion angle of the arm to control the arm such that an end of the arm comes to a location of the object.

12. The control device according to claim 9, wherein, in the generating process, the processor generates the reward based on a correlation between the state and the action of the subject to be controlled.

* * * * *